(12) United States Patent
Kneafsey et al.

(10) Patent No.: US 6,828,291 B2
(45) Date of Patent: Dec. 7, 2004

(54) SEMI-SOLID COMPOSITIONS FOR REMOVING CURED PRODUCT

(75) Inventors: Brendan J. Kneafsey, Dublin (IE); John Guthrie, Kildare (IE); David P. Melody, Dublin (IE)

(73) Assignee: Loctite (R&D) Limited, Dublin (IE)

( * ) Notice: Subject to any disclaimer, the term of this patent is extended or adjusted under 35 U.S.C. 154(b) by 224 days.

(21) Appl. No.: 10/276,419

(22) PCT Filed: May 30, 2001

(86) PCT No.: PCT/IE01/00071

§ 371 (c)(1),
(2), (4) Date: Nov. 15, 2002

(87) PCT Pub. No.: WO01/92430

PCT Pub. Date: Dec. 6, 2001

(65) Prior Publication Data

US 2003/0130150 A1 Jul. 10, 2003

(30) Foreign Application Priority Data

May 31, 2000 (IE) .......................................... 2000/0441

(51) Int. Cl.⁷ ........................... C11D 3/00; C11D 17/00; C11D 17/06; C11D 77/04
(52) U.S. Cl. ....................... 510/200; 510/396; 510/403; 510/445
(58) Field of Search ................................. 510/200, 396, 510/403, 445

(56) References Cited

U.S. PATENT DOCUMENTS

| | | | |
|---|---|---|---|
| 3,664,962 A | 5/1972 | Kelly et al. ................. 252/125 |
| 3,846,363 A | 11/1974 | Ando et al. ......... 260/29.6 BM |
| 4,639,475 A | 1/1987 | Dierichs et al. ............ 523/164 |
| 5,371,131 A | 12/1994 | Gierenz et al. ............. 524/394 |
| 5,433,775 A | 7/1995 | Gardenier et al. .......... 106/211 |
| 5,858,943 A | 1/1999 | Buchwalter et al. ........ 510/204 |

FOREIGN PATENT DOCUMENTS

| | | | | |
|---|---|---|---|---|
| DE | 19-957677 A1 | 6/2000 | .............. C09J/4/06 |
| EP | 0 407 952 A1 | 10/1990 | ............ C09D/9/04 |
| JP | 51-103939 | 9/1976 | ........... C08L/63/00 |

Primary Examiner—Yogendra N. Gupta
Assistant Examiner—John M. Petruncio
(74) Attorney, Agent, or Firm—Steven C. Baumann

(57) ABSTRACT

A composition including at least one solvent for cured product and at least one gelling or solidifying agent. The invention also provides a composition described above which is in the form of a soft solid, for example, in the form of a stick. A pack is also provided, comprising (i) a shaped mass of a composition, which includes at least one solvent for a cured product and at least one gelling or solidifying agent and a container (1) for the composition. The container (1) has a mechanism for expelling the shaped mass.

18 Claims, 1 Drawing Sheet

SEMI-SOLID COMPOSITIONS FOR REMOVING CURED PRODUCT

FIELD OF THE INVENTION

The present invention relates to semi-solid cured product removing compositions, particularly well suited to removal of cured product for example polymerized adhesive, from a substrate. In particular the semi-solid cured product removing compositions of the present invention are suited to removal of cured adhesives such as polycyanoacrylate from substrates.

BRIEF DESCRIPTION OF RELATED TECHNOLOGY

Many types of curable products including adhesives are known and are well documented. Known curable products may be aerobic or anaerobic (cure in the absence of air) and may be formulated in one-or two-part compositions. The curable products may be adhesives, coatings, sealants and such like.

Many curable products present a certain amount of difficulty to users. For instance if curable product is spilled, misplaced, or otherwise makes its way onto an undesired substrate and cures there, it can be difficult to remove later on. Cured product can be removed for example by scraping, by use of further solvent or otherwise. One typical scenario is where the user of, for example an adhesive, mishandles, applies incorrectly or spills the product resulting in unwanted curing of the product, which may be on the skin of the hands etc. Instant adhesives are particularly prone to curing at unintended sites as they leave little or no time for removal before curing. Removal by washing with detergent or solvent may help to remove cured product. Solvents may be volatile evaporating before they have acted sufficiently on the cured product to assist in its removal. Cyanoacrylates are examples of adhesives which are commonly available. Most cyanoacrylate adhesives are instant adhesives curing within a short time of being applied. The cure speed of cyanoacrylates is often of the order of seconds or fractions of a second so that these products are difficult to remove.

It would however be desirable to provide a convenient way to remove such polymerized or cured composition which allowed for ease and convenience of removal of cured product. It would be particularly desirable to provide, an easy to use cured product remover, which could be easily applied to the undesired cured product and which would assist in the removal of the cured product.

It is well known for instance to formulate adhesives as "stick" compositions. The patent literature on stick adhesives is extensive and covers a broad range of adhesive types, from emulsion adhesives through solvent based adhesives, to contact adhesives as well as gelling and solidifying additives for the preparation of the sticks ranging from thermosetting through natural polymers to inert fillers. A well known example of one such adhesive stick sold under the trade name PrittStick™ by Henkel KGaA which is an emulsion-based adhesive.

In the patent literature the following patents typify adhesive components which have been formulated as soft-solids, and more particularly sticks. U.S. Pat. No. 5,433,775 discloses an adhesive stick consisting of a water based preparation of starch derivatives and a soap gel as the shaping gel-forming component. See also U.S. Pat. No. 5,371,131.

U.S. Pat. No. 3,846,363 relates to an adhesive crayon composition containing a sorbitol-benzaldehyde reaction product as an additive. U.S. Pat. No. 4,639,475 discloses an adhesive stick composed of the reaction product of sorbitol and/or xylitol and benzaldehyde as the gel-forming composition together with an adhesive resin which is the reaction product of methyl vinyl ether/maleic acid anhydride copolymers with partially neutralised acid phosphate esters of non-ionic wetting agents of the lower alkylene oxide adduct type. Any of the gelling or solidifying agents of the prior art may be used in the present invention.

Japanese unexamined patent application laid open (Kokai) 51-103939 describes a stick-like epoxy adhesive and a stick-like epoxy hardening agent which is used therewith. The sticks are obtained by suitably compounding gelling agent or/and water and/or organic solvent with liquid or solution type epoxy adhesive and epoxy hardening agent.

DE 199 57 677 A1, published after the priority date of the present application, of Henkel KGaA, describes a cyanoacrylate adhesive, coating or sealing material which also contains at least one condensation product of an aldehyde or ketone with a polyol. The adhesive may be in stick form.

While a wide variety of sticks have been described, no previous suggestion has been made that a cured product removal composition could be made in stick form.

SUMMARY OF INVENTION

The present invention provides cured product removing composition suitable for formulation/presentation in stick form. The compositions are particularly useful for removal of cured adhesive for example polymerized cyanoacrylate adhesive. The compositions are easy to apply and handle allowing for accuracy in application without running on. They can be easily and conveniently applied to the desired site and will remain there until removed.

In particular the present invention provides:

a cured product removing composition including:

(a) at least one solvent for cured product; and (b) at least one gelling or solidifying agent, which is solidified in stick form.

The composition, in contrast to known adhesive sticks is absent any cured or uncured polymerizable product. Known adhesive sticks are not suitable for use as cured product removers as these sticks contain polymerizable compounds which will polymerize exacerbating rather than alleviating the problem. It is clear therefore to the person skilled in the art that therefore no polymerisable monomer, or polymerised polymer in the composition, or in the stick if the composition is in stick form. The composition thus consists essentially of components (a) and (b). The composition does not include any components(s) which effect its ability to remove cured products. Components which could potentially effect its ability to remove cured products include polymerisable monomers/oligomers such as those of cyanoacrylate. It will be appreciated by those skilled in the art that the solvents which are useful for polymerized compounds are distinct from those which are suitable for the monomer or oligomer which polymerizes to form the cured product. The compositions of the present invention are most likely to be applied at room temperature under ambient conditions.

The composition is easily cast in stick form and is very useful in this respect. The present invention thus provides a cured product removing composition. In particular the cured product removing composition has been demonstrated as being particularly useful for removal of cured adhesive such as cyanoacrylate.

More particularly, the present invention relates to the preparation and use of a cured product removing composition in stick form. Suitably the composition is in the form of a soft-solid. The composition may be formulated in stick form for example by casting.

Component (b) is suitably the product of at least one aldehyde and/or ketone condensation reaction with a polyol.

Suitable polyols include those with at least one of a 1,2-diol, 1,3 diol or 1,4 diol structure. The diols may additionally have other groups such as ether, acid, amido, cyano, hemiacetal or halogen. Examples of suitable polyols include 1,2-ethandiol, 1,3-propandiol, 1,2-propandiol, 2,3-butandiol, 1,4-butandiol, 2,2-dimethyl-1,3-propandiol, 2,2-bis(hydroxymethyl)-1,3-propandiol, 2-(bromomethyl)-2-(hydroxymethyl)-1,3-propandiol, 1,3,4-butantriol, 1-phenyl-1,2,3-propantriol, 1,2-hexandiol, neopentylglycol, 1,4-bishydroxymethylcyclohexane, 2-methyl-1,3-propandiol, hexantriol-(1,2,6), 2-(2-hydroxyethoxy)butan-1, 3,4-glycerine, di and polyglycerine, diglycerindiacetate, trimethylolpropane, di-(trimethylolpropane), trimethylolethane, pentaerythritol, bicyclo [2.2.1] heptane-2,3,5,6-tetrol, 2,2,3,3-tetrahydroxybutandiacid, dipentaerythritol, sorbitol, formitol, xylitol, inositol, glucitol, glucose, saccharose/sucrose, starch, cellulose, ascorbic acid, partially or fully hydrolysed polyvinylacetate, 9,10-dihydroxy stearic acid methyl ester, diacetylsorbitol and methylglyceride.

Most suitable polyols are sorbitol, xylitol and mannitol especially sorbitol.

Suitable aldehyde or ketones include those which have at least one substituted or unsubstituted aromatic, heteroaromatic or alicylic ring. These polyols may have additional groups such as ether ester, amide, cyano and halogen.

Examples of ketones include cyclopentanone, cyclohexanone, cycloheptanone, 1-(3,3-dimethylcyclohexyl)-ethanone, 1-cyclopropylethanone, 3-methyl-5-propylcyclohex-2-en-1-one, dicyclopropylmethanone, 4-tert-butylcyclohexanone, dicyclohexylmethanone, 4-methylcyclohexanone, 1-(1-methylcyclopropyl)-ethanone, (4-chlorophenyl)-cyclopropyl-methanone, 1-(1H-pyrrol-2-yl)-ethanone, 1-(2,4,6-trimethylphenyl)-ethanone, 1-(2-furanyl)-2-propanone, 1-(2-naphthalenyl)-ethanone, 1-(2-thienyl)-1-propanone, 1-(4-bromophenyl)-ethanone, 1-(4-methoxyphenyl)-ethanone, 1-(naphthalenyl)-ethanone, 1,1-diphenyl-2-propanone, 1,2-diphenylethanone, 1,3-diphenyl-2-propanone, 1-phenyl-1-butanone, 1-phenyl-1-decanone, 1-phenyl-1-dodecanone, 1-phenyl-1-hexanone, 1-phenyl-1-octanone, 1-phenyl-1-pentanone, 1-phenyl-1-penten-3-one, 1-phenyl-1-tetradecanone, 1-phenyl-2-butanone, 1-phenyl-2-propanone, 1-pyrazinyl-ethanone, 2,2,2-trifluoro-1-phenyl-ethanone, 1-(2-furanyl)-ethanone, 1-(2-pyridinyl)-ethanone, 1-(2-thienyl)-ethanone, 4-chloro-1-(4-fluorophenyl)-1-butanone, 4-phenyl-2-butanone, 1-phenyl-ethanone, bis-(2-hydroxyphenyl)-methanone, bis-(4-chlorophenyl)-methanone, cyclopentylphenylmethanone, cyclopropyl(4-methoxyphenyl)-methanone, cyclopropyl-(4-methylphenyl)-methanone, cyclopropyl-2-thienyl-methanone, cyclopropylphenylmethanone, 1,5-diphenyl-1,4-pentadien-3-one, phenyl-2-pyridinyl-methanone, 2-bromo-1-(4-nitrophenyl)-ethanone, 2-naphthalenylphenyl-methanone, 3-chloro-1-phenyl-1-propanone, 4-(4-hydroxyphenyl)-2-butanone, 4-(4-methoxyphenyl)-3-buten-2-one, 1-(4-pyridinyl)-ethanone, 1-(4-hydroxyphenyl)-ethanone, 1-phenyl-1-propanone, 4-phenyl-3-buten-2-one, diphenylmethanone, 1-phenyl-2-butanone, 1-phenyl-2-buten-1-one, bis-(4-methylphenyl)-methanone, 2-methyl-1-phenyl-1-propanone, 2-chloro-1-phenyl-ethanone, cyclopropyl-(4-fluorophenyl)-methanone, 1-(p-methoxyphenyl)-2-propanone, cyclohexylphenyl-methanone and phenyl-(2-thienyl)-methanone.

The following aldehydes are exemplary of those suitable for use in the present invention benzaldehyde, 3-chlorobenzaldehyde, 4-chlorobenzaldehyde, 2,6-dichlorobenzaldehyde, 2,4-dinitrobenzaldehyde, 3,4-dichlorobenzaldehyde, 3-fluorobenzaldehyde, 4-bromobenzaldehyde, 2-methyltetrahydrobenzaldehyde, tetrahydrobenzaldehyde, 2-methyl-5-isopropylcyclopenten-1-aldehyde, 2,2,4-trimethylcyclohexa-4,6-dien-1-aldehyde, 3(4)-methyl-1-propylcyclohexen-3-aldehyde, 1,3(4)-dimethylcyclohexen-3-aldehyde, 2-methyl-1-propylcyclohexen-3-aldehyde, 3-cyclohexen-1-aldehyde, 2,3,4,5,6-pentafluorobenzaldehyde, 2,4,6-trihydroxybenzaldehyde, 4-tolylacetaldehyde, 2-methylbenzaldehyde, 4-hydroxybenzaldehyde, 3-methylbenzaldehyde, 2-hydroxy-1-naphthalaldehyde, 4-methylbenzaldehyde, 3,5-dimethoxy-4-hydroxybenzaldehyde, cinnam-aldehyde, 3-nitrobenzaldehyde, 2-pentylcinnamaldehyde, 4-diethylaminobenzaldehyde, 4-methoxybenzaldehyde, 2-phenylpropionaldehyde, 2-methoxycinnamaldehyde, 4-methylbenzaldehyde, phenoxyacetaldehyde, methylpyrrol-2-aldehyde, 2,5-dimethoxytetrahydrofuran-3-aldehyde, 2,5-dipropyl-3,4-dihydropyran-2-aldehyde, 2,5-diethyl-3,4-dihydropyran-2-aldehyde, 2,5-diisopropyl-3,4-dihydropyran-2-aldehyde, 2,5-dimethyl-3,4-dihydropyran-2-aldehyde, 2,5-dibutyl-3,4-dihydropyran-2-aldehyde, thiophen-3-aldehyde, indol-3-aldehyde, pyridine-3-aldehyde, pyridine-4-aldehyde and n-methylpyrrole-2-aldehyde.

Desirable aldehydes include benzaldehyde, 3-chlorobenzaldehyde and 3-fluorobenzaldehyde.

Particular acetals and ketals include: di-O-benzylidenmannitol, di-O-(2-chlorobenzylidene)mannitol, di-O-(4-nitrobenzylidene)mannitol, di-O-(3-fluorobenzylidene)mannitol, O-benzylidenesorbitol, di-O-benzylidenesorbitoldiacetate, di-O-(2-chlorobenzylidene) sorbitoldiacetate, tri-O-(4-chlorobenzylidene)sorbitol, O-benzylidenethreitol, O-benzylidene tartaric acid methylester, O-cyclohexylidenglycerine, O-cyclohexylidene ascorbic acid and O-benzylidene-9,10-dihydroxy stearic acid methylester.

Suitably the aldehyde is benzaldehyde, 3-chlorobenzaldehyde or 3-fluorobenzaldehyde especially benzaldehyde. Suitably the polyol is sorbitol, xylitol or mannitol especially sorbitol. The condensation product may be di-O-benzylidene mannitol; di-O-(3-fluorobenzylidene) mannitol or di-O-benzylidene sorbitol especially di-O-benzylidene sorbitol.

Suitable gelling agents for inclusion as component (b) include acetals of sugars, particularly acetals of sorbitol, which are particularly effective as gelling agents. One such gelling agent includes di-O-dibenzylidene sorbitol (also referred to simply as dibenzylidene sorbitol) sold by Roquette Freres, France under the trademark Disorbene™. Other acetals such as those described above have also been found to be useful.

Acetals of sugars, particularly natural sugars, for example acetals of sorbitol, have been previously used as gelling agents for the preparation in stick form and these materials are useful in the present invention.

Component (b) the gelling or solidifying agent is useful for the preparation of a stick from the compositions of the present invention.

Suitably component (b) the gelling or solidifying agent has a concentration in the solvent from about 0.01% to about 20%, such as about 0.01% to about 15%, typically from about 0.05% to about 10% for example about 0.1% to about 5% weight by weight based on the total weight of the composition.

Suitably component (a) the solvent for (dissolving or swelling) cured product comprises an organic solvent in which the target cured product may be at least partially soluble. Component (a) may be an organic solvent selected from at least one of the following:

(i) carbonates such as propylene carbonate and ethylene carbonate (ii) ketones, such as acetone, diethyl ketone, dipropyl ketone, diisopropyl ketone, methyl isopropyl ketone, methyl butyl ketone, methyl isobutyl ketone, ethyl propyl ketone, (iii) esters such as ethyl acetate, acetonitrile, cyanoacetates for example ethyl cyanoacetate, methyl cyanoacetate, propyl cyanoacetate and butyl cyanoacetate and lactones such as gamma butyrolactone, (iv) hydrocarbons, in particular aromatic hydrocarbons such as benzene, toluene and xylene, (v) sulfoxides such as dimethyl sulfoxide, (vi) those containing at least one amine group such as dimethylformamide, and (viii) nitroalkanes such as nitromethane.

Desirably the solvent is propylene carbonate. Also desired for use in the present invention are the cyanoacetates for example ethyl cyanoacetate, methyl cyanoacetate, propyl cyanoacetate and butyl cyanoacetate.

It will be appreciated that the above mentioned solvents could be grouped in many different ways. The above solvents have been grouped in this particular way for ease of discussion. The solvent is for the polymerized product, for example polycyanoacrylate, and it will be apparent to persons skilled in the art which solvent is appropriate in the circumstances. It will be appreciated also that mixtures of solvents can also be used.

Many of the solvents useful in the compositions of the present invention are relatively volatile though they remain where applied in the compositions of the invention for a substantially longer period than the neat solvent would tend to remain. The solvent is thus applied in a convenient form directly to the substrate to be cleaned and the solvent will tend not to evaporate.

The function of the solvent is to assist dislodging of the cured product. This is achieved by the action of the solvent on the polymerized product. As relatively small amounts of solvent may be applied by the user there may not be in any given instance sufficient solvent to solubilize the entire amount of polymerized product. However the solvent does assist in the removal of the product nonetheless as even relatively small amounts of the solvent can act on the product causing it to swell. The swelling of the product is the result of debonding of the product caused by the action of the solvent and the product may become soft and exhibit a sticky or gummy consistency. The product is then easily removed for example by washing or scraping. The term "partially dissolving" as used herein with reference to solvents used in the present invention includes solvents or mixtures of solvents which cause this swelling effect.

The cast stick form is particularly desirable as this allows the product removing composition to be applied in a convenient form. A coating of the composition of selected thickness can be applied to the cured product and left to act. The composition gradually causes the cured product to swell over time to a soft and gummy consistency. The cured product is then in a convenient form for removal. Therefore, any common solvent (or mixture of solvents) in which the cured product dissolves or partially dissolves including those solvents (or mixture of solvents) which will cause the cured product to swell will suffice. The skilled person will know to choose the appropriate solvent(s) for removal of the cured product in question. It will be appreciated that the cured product may be only partially cured at the time it is desired to remove it. The other requirement is that the solvent is one which can be solidified by component (b) at the least one gelling or solidifying agent.

Desirably the composition when solidified has the consistency of a soft-solid or waxy mass. The rheological properties of the mass of product should be such that the mass has a stable geometric shape. It is desirable that the shaped mass e.g. a stick, is applicable by manual rubbing against the substrate to which it is to be applied. The soft or semi-solid mass should be shearable under relatively modest manual pressure to allow for ease of application. It is desirable that the shaped mass retains its shape, for example when stored at 20° C. for a number of days, more desirably for a number of weeks or months. The compositions exemplified herein have proven to be stable (and active) over a number of months and were still active a year later (and looked like remaining active over a further substantial period) when stored under such conditions. The cast composition has the ease of handling advantages of a completely solid material yet remains easily dispensable. PrittStick™ is one commercially available semi-solid mass sold as an adhesive stick which is well known to be dispensable by rubbing to the substrate to which it is desired to be applied and which has a consistency which is very similar to the soft-solids of the present invention.

The invention also relates to the solidified product of a composition as described above. Suitably the composition is solidified in a desired geometric form, for example in a cylindrical shape. Any suitable shape which allows for ease or handling is desired and such shapes are typically referred to as sticks.

One method of preparing a soft-solid or semi-solid mass of the composition includes the steps of:

(i) heating a composition comprising: (a) at least one solvent for (dissolving or partially dissolving) cured product; and (b) at least one gelling or solidifying agent to a desired temperature; and (ii) allowing the composition to cool or cooling the composition sufficiently to set the composition.

Typically the composition will set (solidify to a soft-solid) at a temperature of below about 30° C. for example at about 15–21° C.

The invention also relates to a shaped mass prepared by the method just described and particularly a mass shaped in a stick form.

It will be appreciated that if the composition is cast before cooling to its set temperature then it will take the shape of the container or mould in which it is cast. It is desirable that the composition be cast in a desired geometric shape for example as a stick for example a stick of a generally cylindrical shape. The person skilled in the art will appreciate that the pre-and post-casting composition will have essentially the same compositional make-up, with mainly physical changes from liquid to solid occurring during casting. Little or no solvent will be lost during the casting process. The concentration of the various components thus remains essentially unchanged as between the liquid and solidified (pre- and post-casting) compositions.

In a further aspect the invention provides a method of removing cured product from a substrate comprising contacting a sufficient amount of a composition according to the present invention with the cured product (for a sufficient period) to at least partially remove the cured product. The composition of the present invention may suitably be applied by (manually) rubbing the remover stick to the cured product the substrate. The composition of the invention may act by at least partially dissolving or swelling the cured product.

The invention thus discloses the use of at least one gelling or solidifying agent in the manufacture of a castable cured product removal composition.

The invention also provides an easy to use and consumer-friendly pack comprising:

(i) a shaped mass of a composition according to the invention (a cast composition); and (ii) a container for the composition, the container having a mechanism for expelling the shaped mass. The pack may thus be sold as an article of commerce.

For example the container may have a mechanism for moving the shaped mass between a position where the shaped mass projects from the container, and a position where the shaped mass is substantially located (retracted) within the container. The composition is thus expellable. Suitably the container is a tubular container.

The composition may be cast directly in the container. The container may be of the type having a displaceable mechanism for example a carrier for displacing the mass of the composition relative to the container. The carrier may move the mass so that it projects from the container, or retract the mass so that it is housed within the container. In this way the mass may be extended for application to a substrate or retracted for storage. The container may comprise a cap for protection of the mass when the composition is not in use. Desirably the container has means for manual adjustment of the position of the mass or carrier, for example where the carrier is reciprocally threaded on a winding mechanism and can thus be extended or retracted by rotation of the winding mechanism in one of two directions.

It will be appreciated by those skilled in the art that a multitude of suitable containers may be used with the shapes masses or sticks of the present invention. Typically used containers are those with propulsion (expelling) mechanisms to propel the stick out of the container. Many such containers are known for example for deodorants/antiperspirants, and make-up such as lipstick etc. The stick compositions of the present invention can thus be considered "remover sticks" for example glue remover sticks.

DETAILED DESCRIPTION OF THE INVENTION

Figures 1, 2:
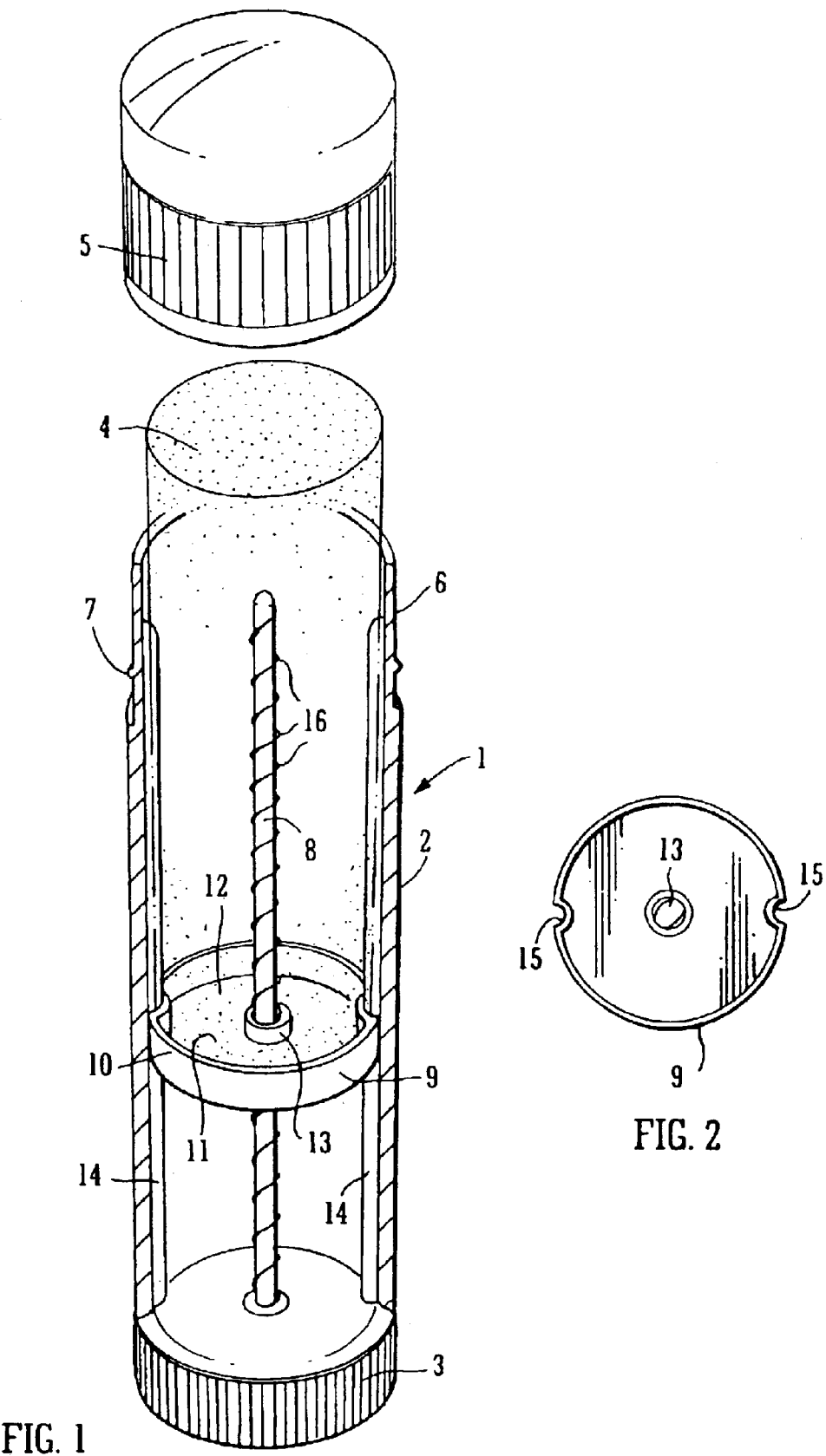
FIG. 1 is a side (part-sectional) elevational view of a container suitable for holding the composition of the present invention.
FIG. 2 is a top view of a carrier which forms part of the container of FIG. 1.

A container for holding a cast (solidified) composition of the invention is now described.

FIG. 1 shows a side view of a container 1 suitable for holding a composition of the present invention. The container is tubular being cylindrical in cross-section having cylindrical side walls 2. On the base of the container is a knurled wheel 3 which forms part of a propulsion mechanism for a (soft-solid or semi-solid) mass or stick 4 of the cured product removal composition of the present invention. The mass 4 has been cast in a generally cylindrical shape as described in the Examples below. The container 10 further comprises a cap 5 which is snap-fit engageable over the top end 6 of the container 1 to protect the mass 4 of product. The top end 6 is of lesser diameter than the side walls 2 and has a rim 7 which engages in a corresponding recess on the underside of the cap 5 to secure the cap 5 in place.

The knurled wheel 3 is attached to an elongate drive or winding shaft 8 which is centrally located within the housing formed by the side walls of the container. On the winding shaft 8 is located a moveable carrier 9. The carrier 9 is generally cylindrical (from an end view thereof see for example FIG. 2) and has a short peripheral upstanding wall 10 formed on its base 11. During the casting process the carrier 9 is positioned to secure itself to the lower end 12 of the mass 4 on solidification of the mass 4. Indeed the mass 4 may be cast also with the shaft 8 (and optionally the wheel 3) in place. As best seen from FIG. 2 the carrier 9 has a central threaded aperture 13 in which the threads 16 of the shaft 8 engage. The knurled wheel 3 and the shaft 8 are both mounted for relative rotation to the container body. When the wheel 3 is turned in the direction of the arrow it moves the carrier up or down the shaft 8 thus controlling the relative position of the mass and the container. In the position shown the carrier has travelled part way up the shaft, moving the mass to a position where it protrudes from the container. The mass can then be applied by rubbing against a substrate by manual force. Sufficient shearing of the mass takes place to allow it to rub off onto the substrate. No separate applicator/brush etc. is necessary. The composition can be applied with manual pressure. To prevent rotation of the carrier 9 with the shaft, elongate ribs 14 are provided on opposing sides of the internal wall of the container. The ribs 14 run from the base of the container to a position proximate to the mouth if the container. The ribs 14 each engage one of corresponding grooves 15 in the carrier 9 thus preventing relative rotation of the container and the carrier and ensuring that the carrier moves upwardly or downwardly when the shaft 8 turns. The carrier 9 and the mass 4 can be retracted by rotation of the wheel 3 in an opposing direction.

The words "comprises/comprising" and the words "having/including" when used herein with reference to the present invention are used to specify the presence of stated features, integers, steps or components but does not preclude the presence or addition of one or more other features, integers, steps, components or groups thereof.

The following examples will serve to illustrate the invention.

EXAMPLES

General

In the following examples the dibenzylidene sorbitol used was the product Disorbene™ described above.

Example 1

1.0 g of dibenzylidene sorbitol was dissolved in propylene carbonate (50 g) with vigorous stirring and the solution allowed to cool for a short period. The solution was then cast into empty stick cartridges of the type typically used for adhesives such as PrittStick™ (and as described above) and was allowed to cool to room temperature. During this time the solution solidified. The solidified stick was clear (transparent) resembling a frozen mass. The solid cured product removal stick could then be extruded using the cartridges inbuilt propulsion mechanism.

The remover composition of the present invention was applied to a polycyanoacrylate stain on a mild steel lap and allowed to stand for 2 to 3 hours. The polycyanoacrylate stain could then be removed by rubbing with a wooden scraper. Normally much greater force would be required. A small amount of residue was easily removed with soapy water.

Example 2

A solution containing the following components was prepared as described in Example 1:
(i) Loctite "Glue Remover*" 10.0 g and (ii) dibenzylidene sorbitol 0.2 g. The solution solidified to form a mass as described in Example 1. The composition was effective as a remover of polycyanoacrylate.
(*available through Loctite sales and distribution outlets internationally for example from Loctite (Ireland) Limited, Tallaght, Dublin, Ireland.)

Example 3

A solution containing the following components was prepared as described in Example 1:
(i) Ethyl cyanoacrylate 10.0 g and (ii) dibenzylidene sorbitol 0.2 g. The solution solidified to form a mass as described in Example 1. The composition was effective as a remover of polycyanoacrylate.

What is claimed is:

1. A cured product removing composition comprising:
   (i) at least one solvent for the cured product; and
   (ii) at least one gelling or solidifying agent, wherein the composition is solidified in stick form.

2. A composition according to claim 1 wherein the composition is in the form of a soft-solid.

3. A composition according to claim 1 wherein component (b) is the condensation product of the reaction between a member selected from the group consisting of an aldehyde, ketone, and combinations thereof, and a polyol.

4. A composition according to claim 3 wherein the aldehyde is a member selected from the group consisting of benzaldehyde, 3-chlorobenzaldehyde, 3-fluorobenzaldehyde and combinations thereof.

5. A composition according to claim 3 wherein the polyol is a member selected from the group consisting of sorbitol, xylitol, mannitol and combinations thereof.

6. A composition according to claim 1 wherein the gelling or solidifying agent is an acetal of sugar.

7. A composition according to claim 1 wherein the gelling or solidifying agent is an acetal of sorbitol.

8. A composition according to claim 1 wherein the gelling or solidifying agent is a dibenzylidene sorbitol.

9. A composition according to claim 1 wherein the gelling or solidifying agent has a concentration in the range of from about 0.01% to about 20% weight by weight based on the total weight of the composition.

10. A composition according to claim 9 wherein component (b) the gelling or solidifying agent has a concentration in the range of from about 0.1 to about 5% weight by weight based on the total weight og the composition.

11. A composition according to claim 1 wherein component (a) is an organic solvent selected from at least one of the following:
    (i) carbonates,
    (ii) ketones,
    (iii) esters, acetonitrile, and cyanoacetates,
    (iv) hydrocarbons,
    (v) sulfoxides,
    (vi) compounds comprising at least one amine group, and
    (viii) nitroalkanes.

12. A composition according to claim 11 wherein component (a) propylene carbonate.

13. A composition according to claim 11 wherein component (a) is one or more cyanoacetates selected from the group consisting of ethyl cyanoacetate, methyl cyanoacetate, propyl cyanoacetate and butyl cyanoacetate.

14. A solidified product of a composition according to claim 1, which is solidifies in a cylindrical form.

15. A method of preparing a soft-solid or semi-solid mass of the composition according to claim 1, the steps of which include:
    (i) heating a composition comprising: (a) at least one solvent for dislodging cured product; and (b) at least one gelling or solidifying agent, to a desired temperature; and
    (ii) allowing the composition to cool or cooling the composition sufficiently to set the composition.

16. A shaped mass prepared by the method of claim 15 shaped in a stick form.

17. A method of removing cured product from a substrate comprising contacting a sufficient amount of a composition according to claim 1 with the cured product to at least partially dislodge the cured product.

18. A pack comprising:
    (i) a shaped mass of a composition solidifies in stick form according to claim 1; and
    (ii) a container for the composition, the container having a mechanism for expelling the shaped mass.

* * * * *